Dec. 6, 1966  KARL-HEINRICH KRAMBEER ETAL  3,290,621
ELECTROMECHANICAL BAND FILTER
Filed April 2, 1964   7 Sheets-Sheet 1

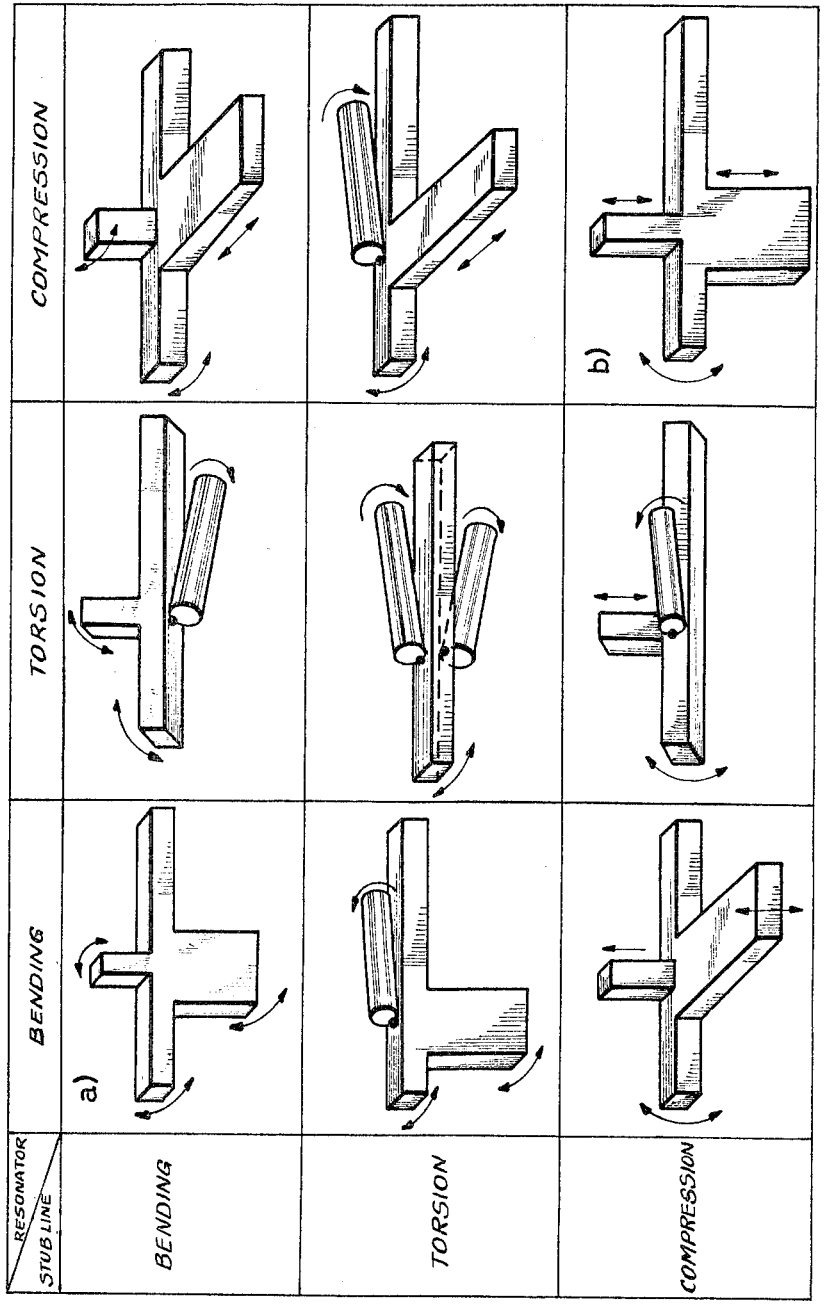

United States Patent Office 3,290,621
Patented Dec. 6, 1966

3,290,621
ELECTROMECHANICAL BAND FILTER
Karl-Heinrich Krambeer and Friedrich Künemund, Munich, Germany, assignors to Siemens & Halske Aktiengesellschaft, Berlin and Munich, Germany, a corporation of Germany
Filed Apr. 2, 1964, Ser. No. 356,981
Claims priority, application Germany, Apr. 3, 1963, S 84,540
3 Claims. (Cl. 333—71)

The invention relates to an electromechanical band filter having a continuous mechanical coupling member (mechanical transmission line) to which several mechanical resonators are coupled.

Electromechanical band filters consist of several mechanical resonators which are mechanically coupled to each other and for which at least one electrostrictive transformation device or system is provided for the transformation of electrical oscillations to mechanical oscillations and vice versa. If only one transformation system is provided, the filter can be used as a bipole in an electrical circuit. If in transmission direction of the mechanical oscillations at the first and at the last mechanical resonator a transformation system is provided, the filter can be inserted as an electrical quadrupole into a circuit for the fulfillment of given requirements. As a rule it is required for electrical transmission purposes that the filter have a band pass characteristic, that is, that the filter transmit electrical oscillations which are fed to the input transformation system and the output transformation system only within a certain limited frequency range. It is frequently essential that the transition from the pass range to at least one of the blocking ranges, considered with reference to frequency, take place as rapidly as possible, and at a blocking attenuation as high as possible at the end of the transition range adjacent the blocking range. This can also be designated as a requirement that the band pass curve of the filter have very steep flanks. Most of the mechanical filter systems heretofore known have an attenuation characteristic whose flank steepness is sufficiently great only where a relatively high number of mechanical resonators are utilized. A high flank steepness can also be achieved with only a few resonators if a so-called attenuation peak or pole is placed at the end of the transition range adjacent the blocking range. For the formation of such an attenuation peak various methods are known. For example, it is possible by a condenser bridging from the output transformation system to the input transformation system, to produce at least one attenuation peak. By this method, however, at best two attenuation peaks can be obtained in the whole filter arrangement, and if two attenuation peaks are so provided, they are no longer independent of one another in their frequency position. Instead of an electrical bridging, a mechanical bridging also obviously is possible, for which the limitation of the reciprocal dependence of the peaks likewise applies. Furthermore, it is a known practice to produce attenuation peaks by mechanical means with the aid of additional resonators, which, however, in many cases represents a very high additional expenditure.

The invention is directed to the production of electromechanical filter attenuation peaks in transmission relation to any desired selectable frequency position, namely, at any desired selectable half-value width and reciprocal indepedence within certain limits, and in which the number of the attenuation peaks is not limited in the blocking ranges, as is the case in the known methods involving at least one bridging.

Proceeding from an electromechanical band filter having a continuous mechanical coupling member (mechanical transmission line) to which several mechanical resonators are coupled, this problem is solved according to the invention by a method wherein the resonators are so selected in their dimensions that in at least one of the blocking ranges of the frequency characteristic of the filter, they create an attenuation peak, and at the coupling point of the individual mechanical resonator to the mechanical transmission line a mechanical reactance, in the form of a side branch, is allocated, whose cross-sectional dimensions and length are so selected that the reactance of the side branch, transformed by the connecting point of the mechanical resonator, creates with the reactance of the mechanical resonator, a matching point in the pass range of the frequency characteristic of the filter.

It is advantageous if the mechanical resonator is coupled over a short coupling conduction element and not directly to the mechanical transmission line, whereby it is possible to achieve an additional matching point or another peak in the frequency characteristic of the filter.

Advantageously there can be provided for the mechanical transmission line, the side branch, the resonator, the coupling element, if any allocated thereto, the same types of vibration in the operation frequencies.

It is also advantageous, among other things, if at least for one of the filter elements (mechanical transmission line, resonator, side branch and coupling element if any), a longitudinal vibration is provided as the form of transmission energy. Advantageous too, for at least one of the filter elements (mechanical transmission line, resonator, side branch and coupling element, if any), a torsional vibration may be used as the form of transmission energy.

Correspondingly advantageous, for at least one of the filter elements (mechanical transmission line, resonator, side branch and coupling element, if any), a bending vibration can be utilized as the form of transmission energy.

From British Patent 865,093 there is known an electromechanical filter in which to a continuous rod of quartz, rod-like resonators lying parallel to the rod axis are coupled over short coupling elements which resonators have in each case a length of a half mechanical wave length λ in the rod material. These resonators and the coupling element consist in the known filter device likewise of quartz and preferably of one piece. Through a coupling point selected slightly outside the resonator center of the coupling element on the individual resonator there results in this known arrangement, over the coupling element, two quarter-wave length resonators somewhat different in their mechanical length. It may be pointed out in this connection that all the resonators and also the rod-like coupling elements which form a mechanical transmission line operate in longitudinal oscillation. It is achieved through this known design of a mechanical filter that, so to speak, there is coupled over a short coupling element, in each case, a mechanical resonator generating an attenuation peak above and below the band center frequency of a quarter-wave length, each with the particular peak frequency. Aside from the fact that this embodiment of a mechanical filter is extremely complicated mechanically, such embodiment involves also the disadvantage that the two attenuation peaks stand, with respect to frequency, in close relation to each other and accordingly, a prescribed tolerance of the transmission attenuation is realizable only with difficulty. In the filter according to the invention these difficulties are practically eliminated. Within very wide limits of arbitrarily selectable half-value width of the individual attenuation peak, and with a freely selectable number of attenuation peaks which corresponds at least to the number of resonators, a simple mechanical construction is assured.

There is furthermore known through U.S. Patent 2,342,869, an electromechanical filter in which the attenuation peaks in the blocking ranges of the filter are achieved by bars placed laterally to a resonator constructed in bar form. Here, however, is involved essentially the coupling on of special resonators which have to be individualy tuned to the frequencies of the attenuation peaks and which, to a certain degree adversely influence the frequency behavior of the whole filter. This is due to the fact that undesired resonances may occur in the blocking ranges, which are formed specifically as a result of the additional resonators. In the invention not only are these difficulties avoided, but in addition the advantage is obtained that selectable matching points are achievable in the pass range of the filter. This feature is of special importance because electromechanical filters for many purposes of use must have not only as high as possible a blocking attenuation with high flank steepness, but also as freely as possible selectable matching points in the pass frequency range. This requirement is of particular importance if the electromechanical filter is used in carrier frequency applications for separating out frequency bands, for example, in the input and output of modulators.

With respect to the material for the filter system, preferably the same material may be utilized for all the elements of the filter (mechanical transmission line, resonator, side branch and the coupling element or coupling elements, if any). In the transformation systems, for example, utilizing electrostitive material, such as barium-titanate. With respect to the material for the filter elements there is contemplated especially steel with a low temperature coefficient and also dielectric materials, such as quartz.

In the drawings, wherein like reference characters indicate like or corresponding parts:

FIG. 3 is a chart illustrating embodiments of the invention in a transmission line with bending vibrations;

Figure 1:
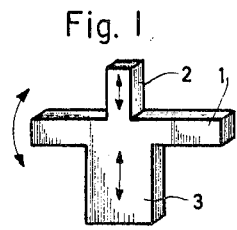
FIG. 1 illustrates a filter embodying the invention, and FIG. 1a; the corresponding equivalent electrical circuit therefor.
Figure 1A:
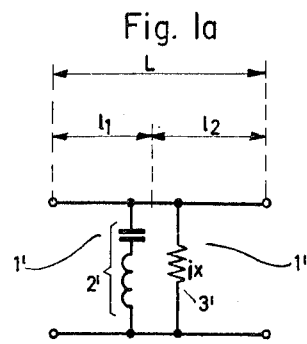

FIGURE 1 illustrates a mechanical transmission line 1, which in the particular embodiment has a square cross-section, but can also have a circular or other cross-section. The left-hand and right-hand ends of the mechanical transmission line 1 are broken off in the drawings and any filter parts connected to these line ends, such as further resonators and the transformation system for the transformation of the electrical vibrations to mechanical vibrations in the mechanical transmission line and conversely, for the transformation from the mechanical oscillations in the mechanical transmission line to the electrical oscillations in the filter output have been omitted for the purpose of clarity. As transformation systems there are recommended especially electrostrictive elements resulting in an especially simple filter construction.

To the mechanical transmission line 1, a mechanical resonator 2 is coupled, the length of the resonator 2 being such that at the peak frequency of given value of the electro-mechanical filter at the transition point into the mechanical transmission line 1, this resonator acts as a series resonance circuit. By a peak frequency there is meant here the frequency in the frequency diagram of the filter at which a maximum of transmission attentuation is to be created from filter input to filter output. Further situated opposite the coupling point of the resonator 2, in the embodiment of FIG. 1, is a mechanical reactance in the form of a side branch 3. This has the function of completing the mechanical reactance at the desired or required pass frequency of the filter, as it is presented by resonator 2, into a parallel resonance circuit. The electrical equivalent circuit diagram corresponding to this embodiment is likewise represented in FIG. 1. If the frequency of the matching point, that is, the frequency at which the parallel circuit of the resonance circuit 2 acts with the side branch 3 as a parallel resonance circuit, is to be above the peak frequency, it is necessary that the reactance value, which is based on the side branch 3 and is designated in the equivalent circuit scheme as $jX$, is capacitive. If the frequency of the matching point is to lie below the peak frequency, then the selected reactance value $jX$ is to be inductive. The side branch acts inductively if its mechanically effective length is shorter than a quarter-wave length in the material of the side branch. If the mechanically effective length is greater than a quarter-wave length, then the side branch member becomes capacitive at the connecting point. Thus, there is considered only the length range between zero and a half wave length. The inductive or capacitive behavior is repeated periodically with a lengthening of the side branch beyond a material half wave length.

In the embodiment of FIG. 1, the resonator 2, which is to act at the peak frequency as series resonance circuit is formed as a relatively thin bar, while the side branch 3 has a relatively large cross-section. These differences in the cross-sectional dimensions were selected in order to bring out an important factual situation. A bar connected only at one end acts, in the case of an effective length of a quarter of the wave length to be excited, as a series resonance circuit which bridges the particular line and creates an attentuation peak. If the frequency of the operating wave is further increased, then, at a length of the resonator of a half operating wave length, at the coupling point there occurs practically the effect of a parallel resonance circuit. Upon a further increase there ensues again a series resonance and the condition repeats itself periodically with an increase of the operating frequency. In the invention there are placed two bar-like conduction pieces 2, 3 on the mechanical transmission line. Both, therefore have periodically repeating parallel and series resonances at the coupling point. If the series resonances of the two parts 2, 3 do not agree, then there results the equivalent circuit as shown in FIG. 1, with the provision, however, the $jX$ is the occurring reactive component of bar 3 at the operating frequency under consideration, which bar, however, at another frequency operates likewise as a series resonance circuit, with the frequency of this series resonance lying always on the side of the required matching frequency which lies opposite the series resonance of resonator 2. It is possible, therefore, as viewed from the frequency viewpoint, to roughly characterize the diagram of the basic quadrupole according to FIG. 1 by stating that between two series resonances, relatively considerably different in frequency, there lies a matching frequency. Whether this matching frequency is more closely adjacent to the one or the other series resonance frequency depends on the wave resistance relation of the parts 2, 3 to one another. If the actual resonator 2 is made relatively thin and the side branch section 3 is made relatively thick in cross-section, then, with increasing thickness of the side branch 3 and diminishing cross-section of the resonator 2, the matching point migrates in the direction of the series resonance of the resonator 2.

It is possible, therefore, as is important for practical use, to place the matching frequency and a peak frequency relatively close to each other. The other (second peak frequency) then lies so far off in frequency that it does not have an adverse effect on the filtering characteristic. It is possible, however, also to utilize this peak frequency for the increase of the blocking attentuation in one of the blocking ranges of the filter. If the cross-section ratio were reversed, that is, resonator 2 made thick and the side branch 3 made relatively thin in relation to each other, then, analogously, for the above considerations, resonator and side branch exchange their functions.

In FIG. 1 there is further illustrated the mechanically effective length L of the section of the mechanical transmission line 1, to which the filter belongs. Further, in FIG. 1, there is illustrated, both in the mechanical embodiment and also in the electrical equivalent diagram, the length $l_1$ or $l_2$, respectively, which lengths determine the distance of the connecting point of the parallel circuit as measured from the beginning of the basic filter member.

Figure 2:
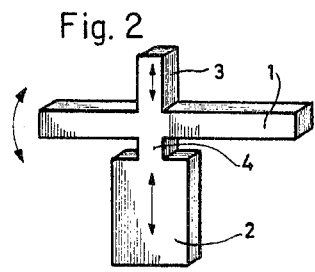
FIG. 2 illustrates a filter similar to that illustrated in FIG. 1, in which the resonator is connected to the transmission line by a coupling element, and FIG. 2a the corresponding electrical equivalent circuit therefor.
Figure 2A:
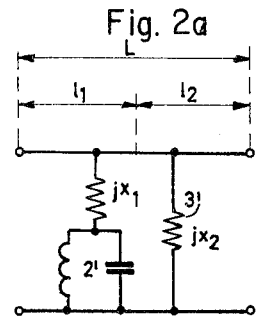

In FIG. 2 there is represented a further development of the invention in such a manner that the resonator 2 is engaged over a coupling element 4 to the mechanical transmission line 1. This mechanical coupling element behaves, according to its length, likewise as a capacitive or inductive reactance. If this coupling element is smaller than a quarter-wave length, it acts inductively, and if it is longer, it acts capacitively. Here there is taken into account only the range in length between zero and a half-wave length in the material of the coupling element. The inductive or capacitive effect repeats itself periodically with a lengthening of the coupling element beyond a half-wave length in the material of the coupling element.

There results thereby an equivalent circuit diagram as also is shown in FIG. 2. In this case the resonator 2 can be dimensioned for the operating frequency, for example, in such a way that in the pass range it exhibits a parallel resonance behavior. This parallel resonance circuit is designated in the equivalent circuit diagram with 2'. It is connected over an impedance $jX_1$ to the common mechanical transmission line. Parallel to this series circuit there lies the reactance $jX_2$ formed by the side branch 3. Considered in terms of frequency, there results thereby, toward higher frequencies first an initial matching frequency, followed by a peak frequency, and toward higher frequencies there follows another matching frequency. If the resonator 2 is so dimensioned as to its electrical length, with or without the coupling element 4, that it acts as a series resonance circuit for a first peak frequency, and simultaneously the electrical length of the side branch 3 is selected so great that this creates an attenuation peak at a second operating frequency different from this, there again appears between the two peak frequencies a matching frequency. Correspondingly also the side branch 3 can be connected over a coupling section to the line 1, in the same manner as is the structure for the resonator 2. In the embodiments of FIGS. 1 and 2 there is utilized as the transmission form of the mechanical vibration energy in the mechanical transmission line 1, a bending vibration which is oriented in such a way that the vibration direction runs in the plane determined by the transmission line 1, the plate-like resonator 2 in conjunction with the side branch 3 or the coupling element 4. Further, in this example, the side branch 3, the resonator 2 or the coupling element 4 are attached in such a manner to the transmission line 1 that in the side branch 3, the resonator 2 and in the coupling element 4 a compression results in the direction of the resonator 2, when the mechanical transmission line 1 is excited in its bending vibrations. The excitation of the resonator 2 and the side branch 3 takes place, thereby, in compression vibrations which, in technical terms, are also designated longitudinal vibrations, and which takes place in the indicated direction of the arrows.

Figure 4:
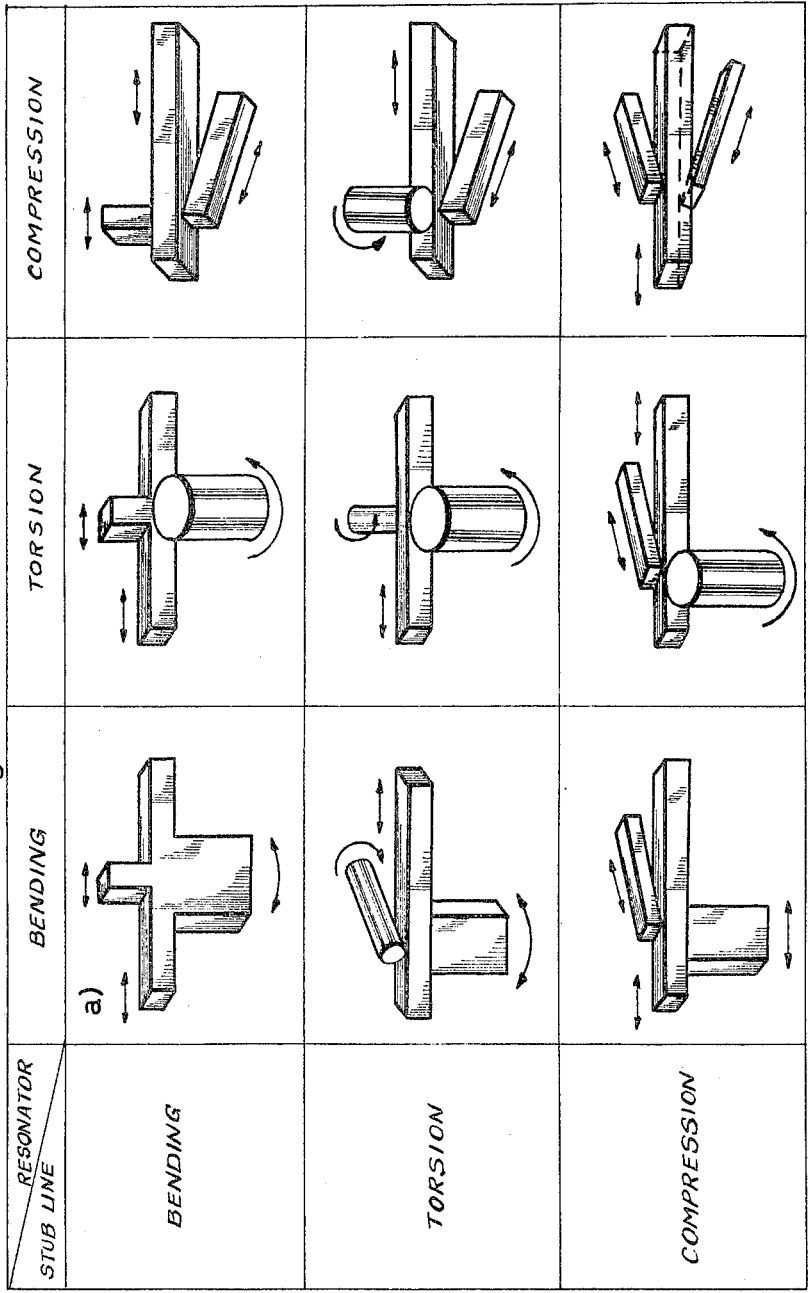
FIG. 4 is a chart illustrating embodiments of the invention in a transmission line with compression vibrations.

Instead of an excitation by compression vibrations in the coupling element, in the resonator and in the side branch and of bending vibrations in the mechanical transmission line, other kinds of vibration are also usable. This is schematically illustrated in tabular form in FIG. 3, which illustrates how, for a filter without a coupling element, the three parts, namely, mechanical transmission line 1, resonator 2 and side branch 3 are to be arranged with respect to each other, so that under the assumption of a bending vibration in the transmission line 1, there is excited in the resonator 2 and/or the side branch member 3 a compression vibration, a torsional vibration or a bending vibration. The lower right-hand drawing of the table of FIG. 3 corresponds, for example, to FIG. 1. The transmission line also can be correspondingly operated in a compression vibration or a longitudinal vibration. In this case both the side branch member and also the resonator can be driven in any of the three kinds of vibration, that is, bending vibration, compression vibration or torsional vibration. This is illustrated in FIG. 4 in tabular form.

Figure 5:
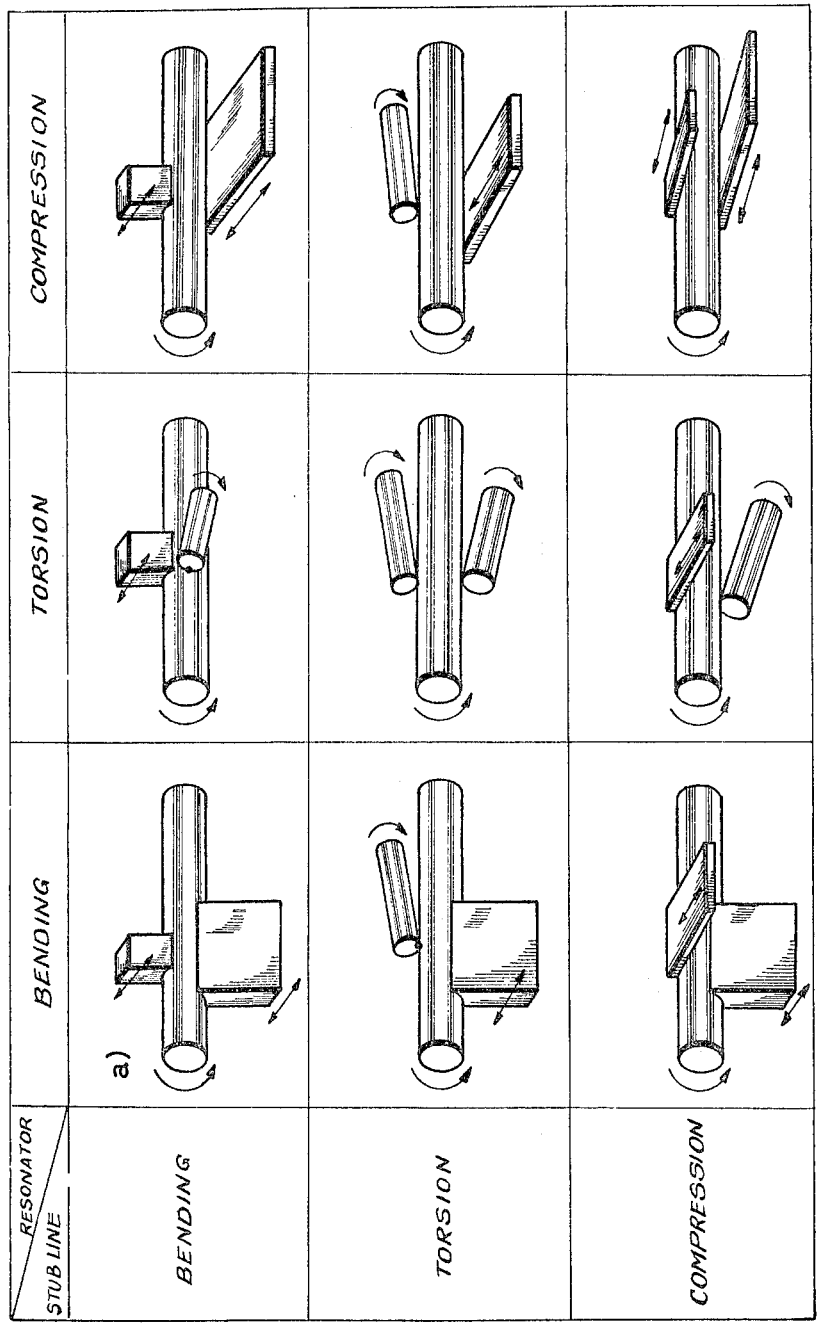
FIG. 5 is a chart illustrating embodiments of the invention in a transmission line with torsional vibrations.

With the use of torsional vibration in the mechanical transmission line 1, it is likewise possible to realize the three types of vibration mentioned in the resonator or in the side branch member. Possible forms therefor in a band filter according to the invention for the operation of the individual filter elements (mechanical transmission line, resonator, side branch) are summarized in tabular form in FIG. 5.

Figure 6:
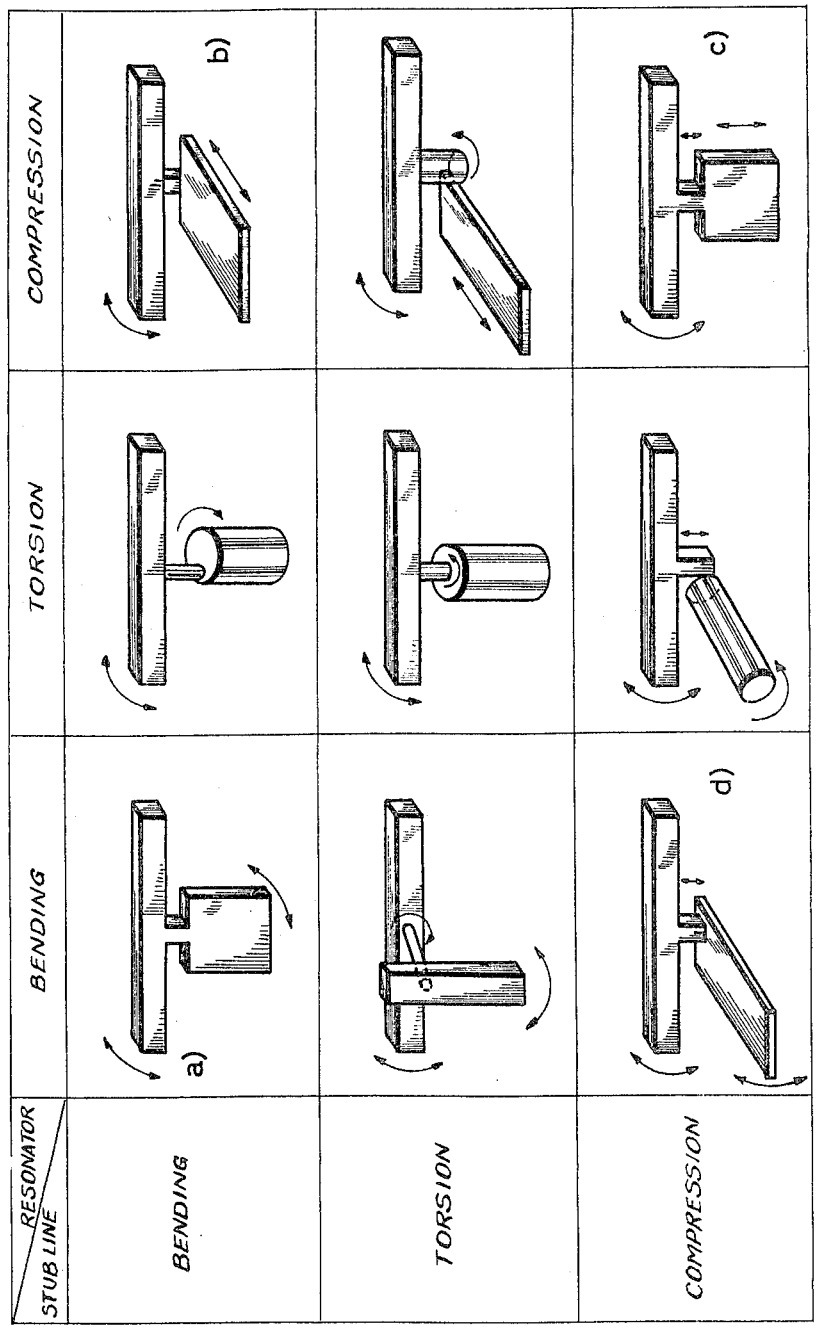
FIG. 6, 7 and 8 are charts, generally corresponding to FIGS. 3, 4 and 5, respectively, illustrating filter structures embodying coupling elements for the resonators, in which figures the side branches are not illustrated.
Figure 7:
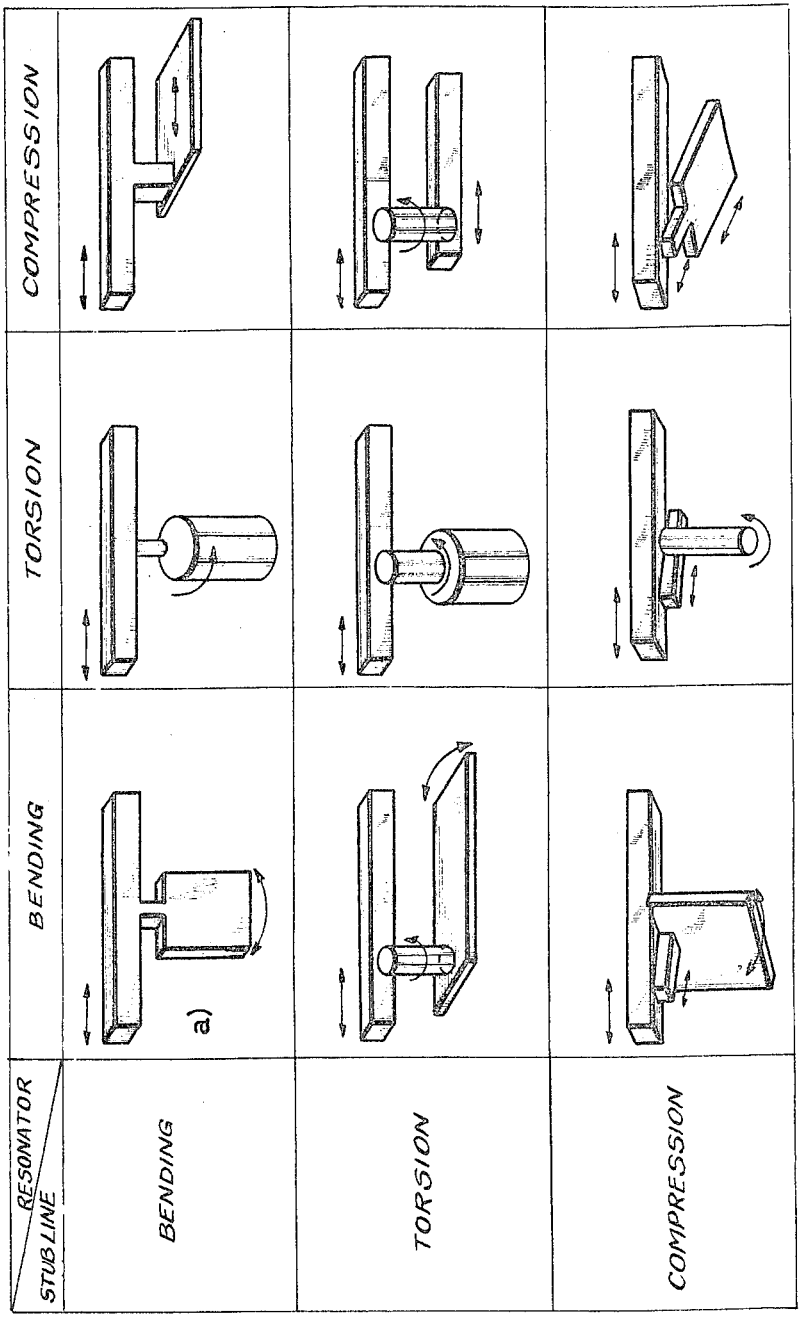
Figure 8:
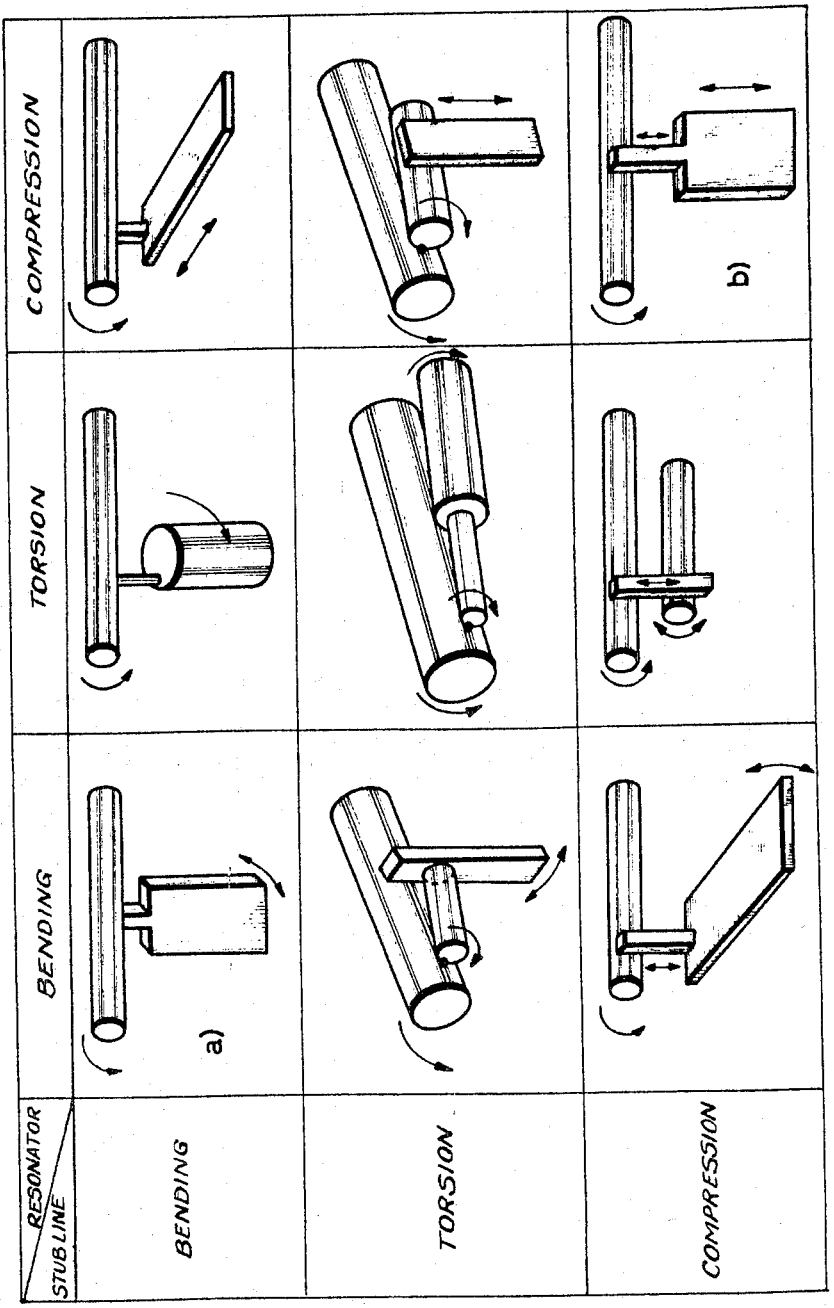

For the use of a coupling element for the connection of the resonator 2 to the mechanical transmission line 1, there also exists a series of possibilities, in which for the coupling element 4 the three aforementioned vibration types can be used. In order to clarify this, in each of the three remaining figures of the drawings, FIGS. 6, 7 and 8, only the mechanical line member, the coupling element and the resonator are represented. Consequently, these are to be imagined additionally in each case corresponding to FIGS. 3, 4 and 5, also a side branch member connected at the connection points of the respective coupling elements 4.

As already mentioned, considerable freedom exists with respect to the cross-sectional form for the individual filter elements, which therefore can be selected in the most favorable manner for the particular form of vibration. In order to indicate this in the drawings, in FIGS. 3 to 8, for torsional vibrations essentially circular cross-sections are selected, and for bending and compression vibrations, respectively, essentially square and rectangular cross-sections are employed. However, it is of course possible to excite a torsional vibration, for example, in a bar with square cross-section or a compression vibration or a bending vibration in a bar with circular cross-section.

In FIGS. 3 to 8 in the individual drawings, the mechanical transmission line and the mechanical resonators, and in some representations also the side branches and/or the coupling elements are represented as inclined to one another at an acute angle, in order to demonstrate that, theoretically, contact exists between the corresponding elements only at a point. This acute angle construction is avoidable by providing the two filter elements abutting each other with slightly beveled portions or by providing a corresponding appendage. In such case, for example, the resonators and also the side branches are correspondingly alignable with each other.

Especially favorable relations result for a filter according to the invention when embodiments corresponding to FIGS. 3a, 3b, 4a, 5a, 6a, 6b, 6c, 6d, 7a, 8a, and 8b are selected because, among other reasons, they provide especially favorable resonator and coupling element configurations. Furthermore, in the embodiments illustrated, the resonators are in each case shown free standing at their far end from the transmission line. It is, however, possible, by a lengthening of individual resonators by a mechanical quarterwave length in the particular type of vibration of the resonator, to secure the individual resonators at such far ends from the mechanical transmission line 1, since in this manner of lengthening of the mechanical resonator the free resonator end is, so to speak, mechanically inactive and practically stationary.

Figure 9:
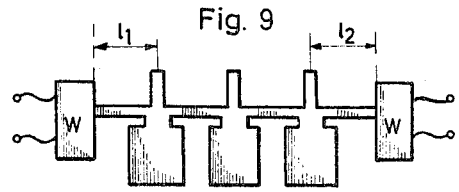
FIG. 9 is a plan view of a filter embodying the invention.

FIG. 9 illustrates an example of a filter wherein the basic filter sections according to FIGS. 1 to 8 can be assembled into a chain filter, in which case the mechanically effective length L of an individual filter section is to be selected in such a way that the required band pass characteristic results, and $l_1$ and $l_2$ are to be selected in such a way that the particular transformation system W is fully integrated into the filter, with respect to the filtering characteristics. The length $l_1$ and $l_2$ in FIG. 9 can be selected with much greater freedom if the individual transformation system W is considerably less selective than the mechanical filtering system proper, consisting of the resonators in connection with the coupling elements, the side branches and the mechanical transmission line. It is further recommended that the filter system be so shielded that it is free of reflection over the transformation system W with respect to the internal resistance of the electrical vibration source on the one hand and with the load resistance on the other hand. The transformation systems W at both ends of the electromechanical filter are preferably electrostrictive elements which convert the electrical oscillations into the corresponding mechanical oscillations or the mechanical oscillations into electrical oscillations. With use of the filter as a bipole, one of the transformations can be omitted.

Figure 10:
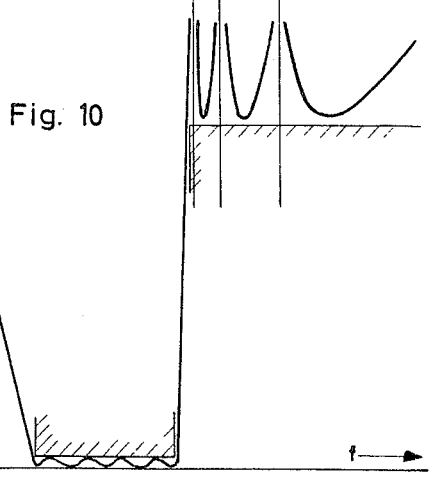
FIG. 10 is a graph illustrating an attenuation characteristic curve which can be achieved with a filter constructed in accordance with FIG. 9.

FIG. 10 illustrates an attenuation characteristic curve, which can be achieved with a filter, according to FIG. 9, by selection of the dimensions of the resonators, of the side branches of the coupling elements and of the transmission line, including the transformation systems. The shaded portions represent a tolerance diagram of the transmission attention $a_b$. Two attenuation peaks, for example, are disposed in the lower frequency blocking range and three attenuation peaks are disposed in the higher frequency blocking range. Although only three resonators are present, five attenuation poles are utilized in the blocking ranges, since, of two filter base sections of the two possible attenuation poles of each filter base section, the one is placed in the lower frequency and the other in the higher frequency blocking range, with placement of the corresponding matching point in the pass range. For one filter base section, only one attenuation peak is shown in the attenuation diagram presented, namely, the one in the higher frequency blocking range. The other attenuation peak may lie at very low frequencies. In the pass range, five matching points are achieved, of which three points are allocated to the three filter base sections and two to the transformation systems supplemented by $l_1$ and $l_2$. In FIG. 9, for reasons of simplification, the coupling elements are illustrated as being of the same length, and likewise the resonators and side branch members are represented as of like construction. These filter elements are to be constructed differently according to the frequency positions mentioned in accordance with the preceding discussions.

The support of the filter system may be so accomplished that the filter system is held over the transformation system or systems, in which case the individual resonators are free at their far ends facing away from the mechanical transmission line. Advantageously, however, support of the filter system is also possible by a method such that supporting elements are engaged in neutral zones of at least some of the resonators. If, for example, longitudinal vibrators of the effective length $\lambda/2$ ($\lambda$ = wave length in the vibrator material) are utilized as resonators, these can be rigidly connected with the supporting member at a distance of about $\lambda/4$ from the free end thereof, which, in turn, can be anchored in a filter protective casing.

Changes may be made within the scope and spirit of the appended claims which define what is believed to be new and desired to have protected by Letters Patent.

We claim:

1. An electromechanical band filter comprising a continuous mechanical transmission line, at least one mechanical resonator connected to said line, a mechanical reactance in the form of a sidebranch connected to said transmission line, said resonator and said sidebranch each having oppositely disposed ends, and each operatively attached at one of such ends to the mechanical transmission line, and the respective opposite ends being free, such attachments falling in a common cross-sectional plane of said mechanical transmission line, said resonator having such physical dimensions with respect to the particular form of oscillation involved that it acts as a single series resonance circuit to generate an attenuation peak at a frequency falling in the blocking range of the filter, said side branch having such length and cross-sectional dimensions, which are different from the corresponding length and cross-sectional dimensions of the resonator, that it acts as a parallel resonance circuit and with the reactance component of the mechanical resonator generates a matching point in the frequency characteristics of the filter at a frequency falling in the pass range thereof.

2. An electromechanical band filter comprising a continuous mechanical transmission line, at least one mechanical resonator connected to said line by a coupling element, a mechanical reactance in the form of a sidebranch connected to said transmission line, said resonator and said sidebranch each having oppositely disposed ends, said coupling element having a different cross-section than said resonator and connecting one end of the latter to said transmission line, said sidebranch having one end thereof connected to said transmission line and the other end being free, the attachments of said coupling element and said sidebranch with the mechanical transmission line falling in a common cross-sectional plane of said line, said resonator having such mechanical dimensions with respect to the particular form of oscillation involved that it acts as an individual parallel resonance circuit to generate a matching point in the frequency characteristics of the filter, said coupling element having such length and cross-sectional dimensions, which are different from the corresponding dimensions of the resonator, that it acts as a reactance connected ahead of the resonator, which reactance, together with the reactance component of the resonator, generates an attenuation peak at a frequency falling in the blocking range of the filter, said sidebranch having such length and cross-section dimensions, that the reactance thereof, together with the reactance components formed by the resonator and coupling piece, generates another matching point in the frequency characteristics of the filter, one of said matching points falling in the pass range of the filter.

3. An electromechanical band filter comprising a continuous mechanical transmission line, at least one mechanical resonator connected to said line by a coupling element, a mechanical reactance in the form of a sidebranch connected to said transmission line, said resonator and said sidebranch each having oppositely disposed ends, said coupling element having a different cross-section than said resonator and connecting one end of the latter to said transmission line, said sidebranch having one end thereof connected to said transmission line and the other end being free, the attachments of said coupling element and said sidebranch with the mechanical transmission line falling in a common cross-sectional plane of said line, said resonator having such mechanical dimensions with respect to the particular form of oscillation involved that it acts as an individual series resonance circuit, said coupling element having such length and cross-sectional dimensions, which are different from the corresponding dimensions of the resonator that it acts as a reactance connected ahead of the resonator, which reactance, together with the reactance component of the resonator, acting as a series resonance, generates an attenuation peak at a frequency falling in the blocking range of the filter, said sidebranch having such length and cross-sectional dimensions, that the reactance thereof, together with the reactance components formed by the resonator and coupling piece, generates a parallel resonance and thereby creates a matching point in the frequency characteristics of the filter falling in the pass range thereof, said sidebranch further having such length and cross-sectional dimensions that it thereby generates a second series of resonance to create a second attenuation peak in the frequency characteristics of the filter at a frequency falling in the blocking range, one of said two attenuation peaks falling below and the other above the filter pass range.

References Cited by the Examiner

UNITED STATES PATENTS 2,915,716  12/1959  Hattersley _____ 333—84
3,015,789  1/1962  Honda et al. _____ 333—71

ELI LIEBERMAN, *Primary Examiner.*

L. ALLAHUT, *Assistant Examiner.*